June 7, 1938.　　　　　S. O. REXROAD　　　　　2,119,687
VALVE STEM AND VALVE
Filed Sept. 6, 1933　　　　2 Sheets-Sheet 1
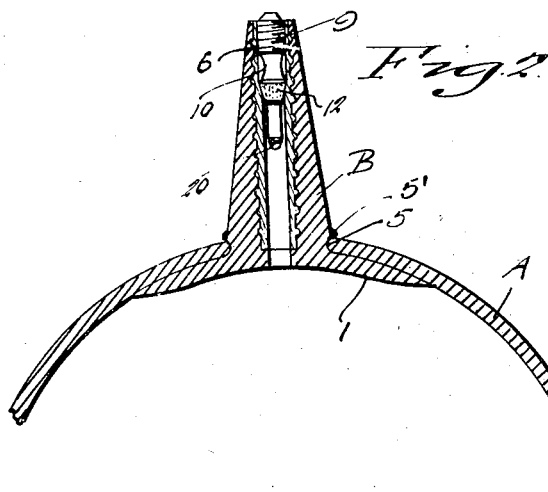
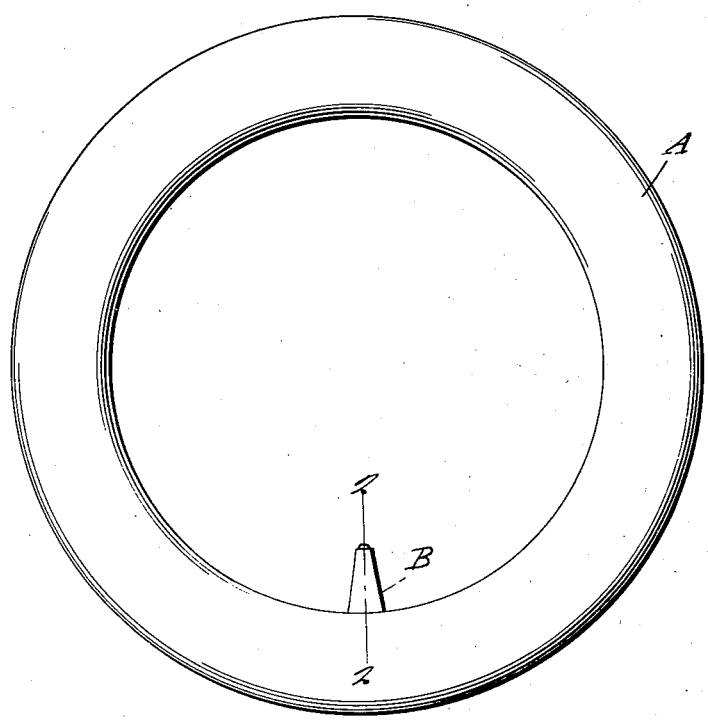
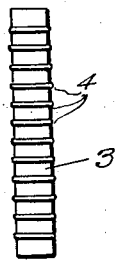
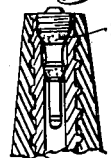
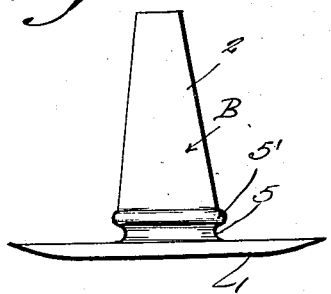
Inventor
Schuyler O. Rexroad
By Clarence A. O'Brien
Attorney June 7, 1938.   S. O. REXROAD   2,119,687
VALVE STEM AND VALVE
Filed Sept. 6, 1933   2 Sheets-Sheet 2
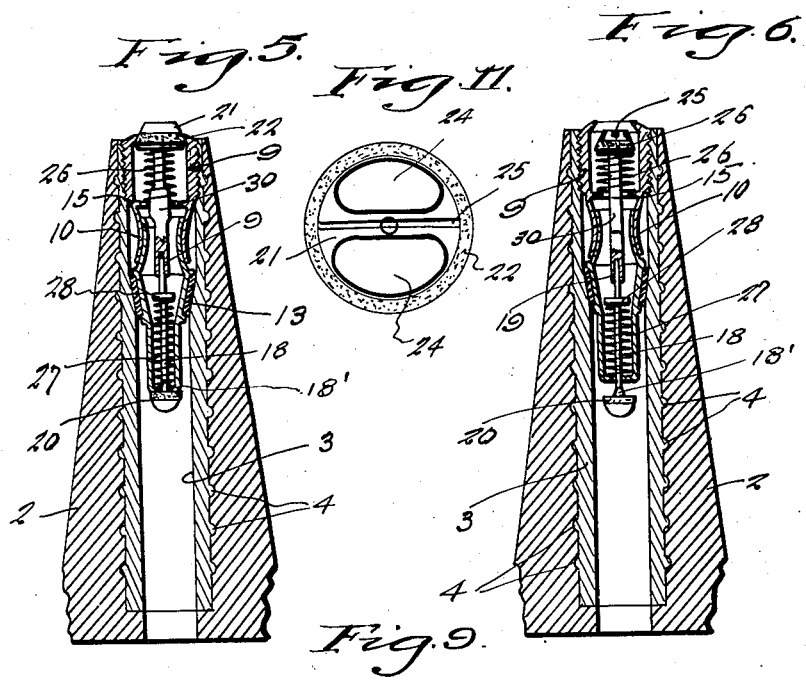
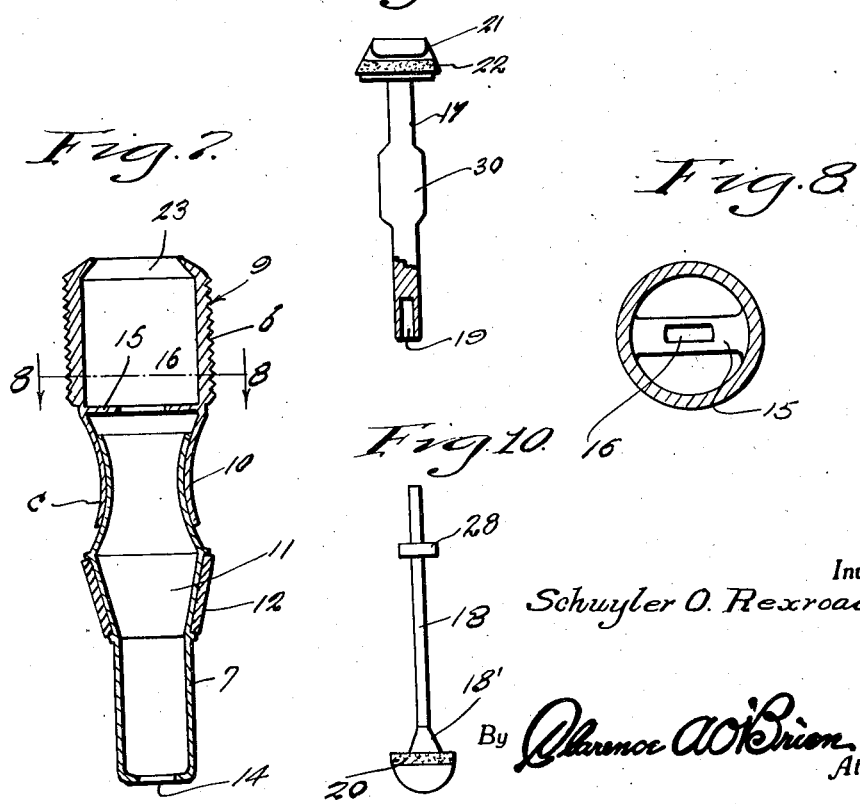
Inventor
Schuyler O. Rexroad
By Clarence A. O'Brien
Attorney Patented June 7, 1938

2,119,687

UNITED STATES PATENT OFFICE 2,119,687

VALVE STEM AND VALVE

Schuyler O. Rexroad, Camden-on-Gauley, W. Va., assignor to Scovill Manufacturing Company, Brooklyn, N. Y., a corporation of Connecticut Application September 6, 1933, Serial No. 688,368

4 Claims. (Cl. 277—42)

This invention relates to improvements in valve stems and valves, the general object of the invention being to provide a rubber valve stem which eliminates the use of a dust cap and which contains a metal sleeve which carries the valve assembly.

Another object of the invention is to make this valve assembly with a pair of valves, which provides double protection against leakage of air.

A further object of the invention is to provide means whereby a slight turning movement of the valve member will hold the two valves in open position so that air can escape from the tube and this arrangement eliminates the use of deflators or the removal of the valve assembly.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a view of a tube, showing the invention in use thereon.

Figure 2 is a section on line 2—2 of Figure 1.

Figure 3 is a view of the assembly removed from the tube.

Figure 4 is a view of the liner or sleeve.

Figure 5 is a longitudinal sectional view through the invention, with the valves in closed position.

Figure 6 is a similar view, but with the valves in open position.

Figure 7 is a view of the sectional valve shell.

Figure 8 is a section on line 8—8 of Figure 7.

Figure 9 is a view of the upper valve member.

Figure 10 is a view of the lower valve member.

Figure 11 is an enlarged plan view of the upper valve.

Figure 12 is a sectional view showing a slight modification.

In these drawings, the letter A indicates a tube and the letter B indicates the valve assembly which includes the base or disk 1 and the tapered tubular stem 2 formed of rubber or a composition of rubber with a metal liner or sleeve 3 located in the stem 2, with one end of the sleeve substantially flush with the outer end of the stem and the other end of the sleeve being slightly spaced from the inner end of the stem. The liner is corrugated or roughened, as shown at 4, and the parts are vulcanized together. The stem 2 is passed through a hole in the tube A, as shown more particularly in Figure 2, with the base 1 vulcanized to a portion of the inner wall of the tube, as also shown in Figure 2, and I prefer to form an annular groove 5 in the base of the stem to receive a portion of the tube, as shown in Figure 2. I also provide a rib 5' on the stem which acts to help hold the stem in place until the inner tube is inflated.

A valve shell C is placed in the liner or sleeve 3 and is composed of the sections 6 and 7, the outer end of the section 6 being threaded, as shown at 9, to fit in the threaded outer end of the sleeve and the inner end of the section 6 is swively mounted over the outer or adjacent end of the section 7, these parts being curved, as shown at 10, so that when the section 6 is pressed upon the section 7, an air-tight joint will be formed between the curved portions 10. The section 7 has an intermediate tapered part 11 which carries a tapered ring 12 of rubber or the like for engaging a seat forming part 13 formed in the sleeve 3, so that by threading the shell in the sleeve, the ring 12 will come to rest upon the seat 13 and then by continuing the rotary movement of the section 6, the sleeve 12 will be forced tightly against the seat 13 and the inner end of the section 6 will be forced into tight contact with the adjacent end of the section 7 and thus the shell has an air-tight connection with the sleeve. The inner end of the section 7 is of reduced cylindrical shape and has an opening 14 in its free end providing a valve seat thereat, while a cross piece 15 extends across an intermediate portion of the section 6 and has a slot 16 therein, as shown more particularly in Figure 8.

The valve member is composed of the stems 17 and 18, the stem 17 having a socket 19 in its inner end for receiving the adjacent end of the stem 18 and said stem 18 carries the valve head 20 at its inner end for controlling the opening 14. The outer end of the stem 17 carries the head 21 which includes the resilient part 22 and this head 21 is adapted to engage the seat 23 formed at the outer end of the section 6. The head 21 is formed with the recesses 24 in its outer face and the slot 25, so that a screw driver or other tool can be used for turning the head 21 and the stem 17.

A spring 26 is placed on the stem 17 and has one end bearing against the head 21 and its other end against the cross piece 15 and a second spring 27 is placed on the stem 18 and bears against the lower end of the section 7 and against a projection 28 on the stem 18. These springs tend to hold the two valve heads 20 and 21 against their seats, closing the opening 14 and the opening at the outer end of the shell C, and when in closed position, the stem 18 is slightly spaced from the bottom of the socket 19 in the stem 17, as shown in Figure 5. However, by pushing upon the head 21, the upper valve formed by said head is moved to open position and movement of the stem 17 will move the stem 18 and move the valve or head 20 to open position, as shown in Figure 6.

In order to hold the valves in open position, I form a flattened part 30 on the stem 17, which passes through the slot 16 in the cross piece 15, and by forcing the stem 17 downwardly and then giving it a quarter turn, the flattened part 30 will be placed crosswise of the opening 16 and thus the valves will be held in open position. When the flattened part 30 extends through the slot 16, the parts can be turned by a screw driver or the like placed in the slot or kerf 25 so as to screw the outer end of the section 6 into the threaded part of the sleeve 3. Of course, by turning the parts in the opposite direction, the shell can be unscrewed from the sleeve.

By extending the rubber stem to the top of the sleeve, the usual dust cap is eliminated and the danger of cutting or injuring the inner tube when the tire is run flat is reduced to a minimum, and this arrangement also effects a saving in the cost of manufacture and simplifies the operation of vulcanizing the rubber to the metal liner.

The double valve insures double protection against air leakage and the outer valve 21 prevents any dirt or dust or other foreign matter entering the valve arrangement, while preventing the escape of air, if any air should pass the inner valve 20.

Whenever it is desired to deflate or partly deflate the tube, it is simply necessary to push the valve assembly downwardly and then give it a quarter turn so as to cause the flat part 30 to be held by the bar 15 and then both valves will be in open position and the air can escape from the tube.

All valve faces and seats may be of the conventional type.

The lower end of the stem 18 is formed with the guiding part 18', as shown in Figure 10.

In the modification shown in Figure 12, a valve forming part 31 is carried by the valve shell immediately below the threaded part of the shell and this valve part 31 engages a seat forming portion adjacent the upper end of the metal liner or sleeve 3'. Thus in this construction the shell is formed with two valve parts exteriorly arranged for engaging a pair of seats in the liner or sleeve 3'.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. A valve assembly of the class described comprising a shell, having a valve seat at each end thereof, a pair of valve stems passing through the shell, one stem having a socket in its inner end for receiving the adjacent end of the other stem, valve heads on the other ends of the stems for engaging the seats, spring means for normally holding the heads on the seats, a cross bar in the shell having a slot therein, and a flat part on the outer stem passing through the slot and acting to hold the valve heads in open position when said stem is turned a quarter turn to place the flattened part at right angles to the slot.

2. In a valve assembly, a shell including two sections having their adjacent ends in overlying relation, a sleeve in which the outer section is threaded, said sleeve having a valve seat therein, a valve part carried by the inner section for engaging said seat, said overlying parts of the shell forming an air-tight joint when the valve part engages the seat and the outer section is moved inwardly relative to the inner section, a pair of valve stems passing through the shell, valve heads carried thereby engaging the ends of the shell, springs for normally holding the valve heads in closing position, and means whereby opening movement of the outer valve head will open the other head.

3. A valve assembly of the class described comprising a sleeve, a shell threaded in the sleeve and having a valve seat at each end thereof, a double valve engaging the seats, means for locking the double valve in open position, and spring means for holding the double valve in closed position.

4. In a valve assembly, a valve insides comprising a shell consisting of two tubular sections with parts in overlying relation which are complementally bowed inwardly to provide a swivel connection between said sections, a valve seat on one of said sections, a valve for engaging said seat, and a spring within said shell for normally holding the valve onto its seat.

SCHUYLER O. REXROAD.